July 14, 1959 — A. M. EWING — 2,894,705
FLOWER RACK FOR CASKET
Filed June 14, 1955 — 2 Sheets-Sheet 1
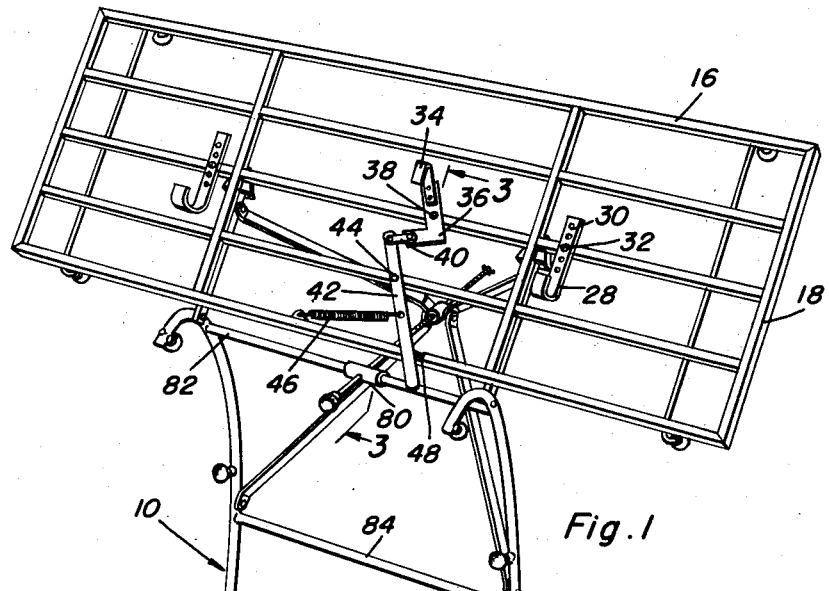
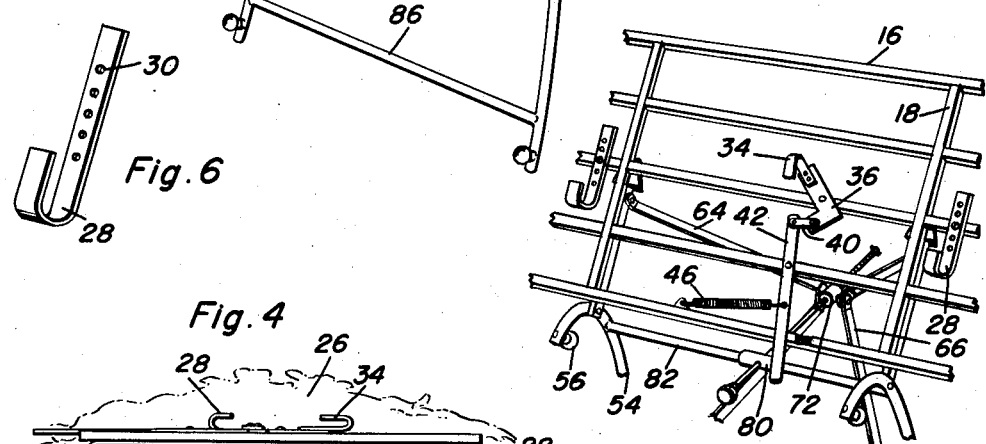
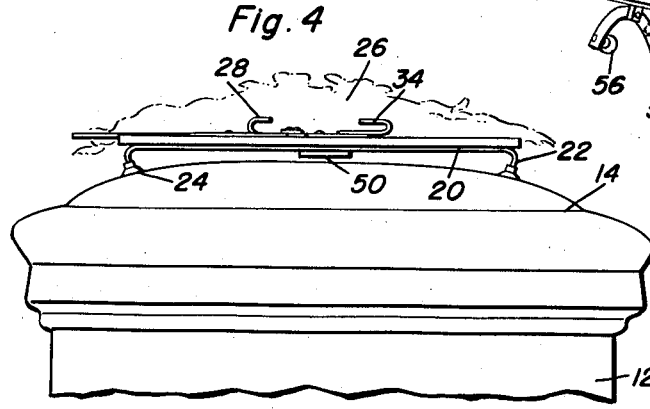
Alfred M. Ewing
INVENTOR.

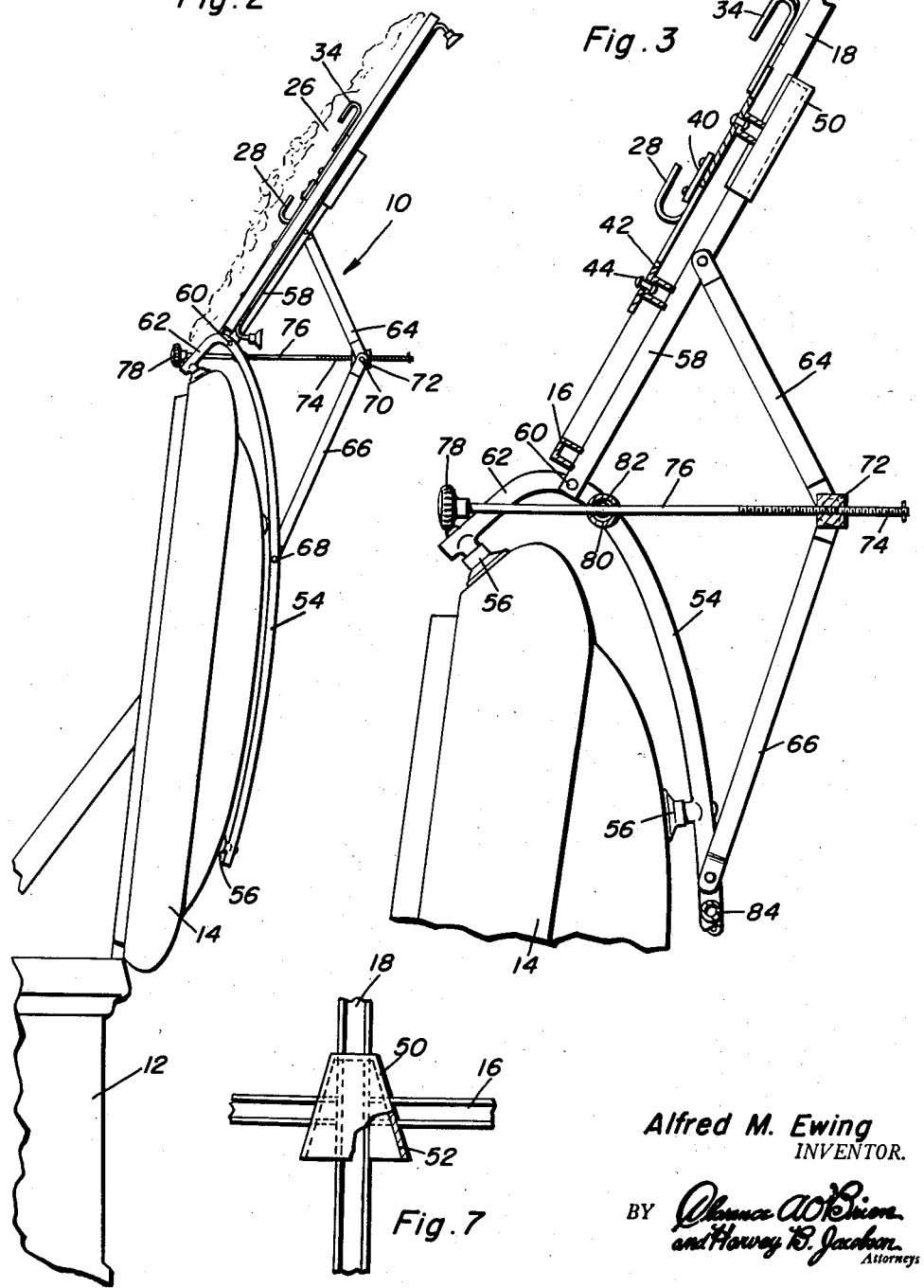

United States Patent Office 2,894,705
Patented July 14, 1959

2,894,705

FLOWER RACK FOR CASKET

Alfred M. Ewing, Hanoverton, Ohio

Application June 14, 1955, Serial No. 515,315

2 Claims. (Cl. 248—27.8)

The present invention generally relates to flower racks, and more particularly to flower racks adapted for mounting on caskets to securely hold flower sprays thereon when the casket is being transported and when it is in open position.

An object of the present invention is to provide a flower rack for caskets which may be attached to the top of a casket when the top is in closed relation for securely retaining flower sprays thereon to prevent accidental dislodgement of the flower sprays during movement or transportation of the casket.

Another object of the present invention is to provide a flower rack for caskets which is attached to the top of the casket when it is in open position for supporting the flower sprays in a display relation wherein such flowers will be securely retained in position.

Yet another important feature of the present invention is to provide a flower rack for caskets which is simple in construction, easy to apply, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the flower rack of the present invention;

Figure 2 is an end elevational view of the flower rack of the present invention installed upon a casket top when it is in open position;

Figure 3 is an enlarged sectional view taken substantially upon a plane passing along section line 3—3 of Figure 1 illustrating the details of construction of the flower rack in the present invention;

Figure 4 is an end elevational view illustrating the flower rack of the present invention in use on the closed top of a casket;

Figure 5 is a detailed perspective view illustrating the structural details of the flower spray engaging mechanism;

Figure 6 is a perspective view illustrating one of the adjustable hook members; and Figure 7 is a detailed view with portions broken away illustrating the downwardly flared pockets for detachable engagement of the framework with the supporting arms.

Referring now specifically to the drawings, the numeral 10 generally designates the flower rack of the present invention for attachment to caskets 12 having a pivotally opening top 14 which may be transported when the top 14 is in closed position, as shown in Figure 4, or provided with the top 14 in open position when the casket is positioned in the funeral home or church.

The flower rack 10 includes a plurality of longitudinal rails 16 interconnected by a plurality of transverse rails 18, all of which form a rigid open framework. Secured to the rear surface of the longitudinal members 16 adjacent the outer ends thereof and in parallel relation to the transverse members 18 is a pair of supporting rails 20 having downturned outer ends 22 having suction cups 24 adjustably secured to the lower ends thereof for engagement with the upper surface of the top 14 of the casket 12 whereby the open framework formed by the members 16 and 18 may be supported on tops 14 having various contours whereby flower sprays 26 will be securely retained on the top 14 of the casket 12.

For supporting the flower sprays 26 on the open framework, a pair of hook members 28 are provided which have a plurality of apertures 30 in the shank thereof for adjustable attachment to one of the longitudinal members 16 by a screw threaded fastener 32. The hooks 28 are in alignment and face in the same direction for engaging one side of a flower spray 26. Mounted in opposing relation to the hook members 28 is a hook 34 secured to a bellcranck 36 which is pivotally attached to a longitudinal member 16 by pivot pin 38. The other end of the bellcrank 36 is connected by a length 40 to the free end of an elongated pivotal handle 42 that is pivotally attached to another longitudinal member 16 by pivot pin 44 and spring biased by use of a tension spring 46 wherein the hook 34 will be normally urged or biased towards the upwardly opening hook 28 for clamping flower spray 26 therein. The lower longitudinal member 16 is provided with a notch 48 which is adapted to engage the elongated handle 42 for retaining the handle in retracted position so that the hook 34 will be moved to a retracted position to permit placement and removal of the flower sprays 26 on the supporting rack 10. The spring 46 will urge the hook 34 towards the hooks 28 and inasmuch as the hook 34 is disposed between the hooks 28, flower sprays 26 will be securely retained on the front surface of the open framework formed by the longitudinal members 16 and the transverse members 18.

The two central transverse members 18 are provided with downwardly opening pocket members 50 which are provided with downwardly and outwardly flared side walls 52 forming a guide for the entrance into the pockets 50 for a purpose described hereinafter.

For supporting the open framework on the top 14 of the casket 12 when the top is in open position, as illustrated in Figures 2 and 3, a pair of support rails 54 are provided with suction cup members 56 at each end thereof and adjacent the central portion for engagement with and attachment to the top 14 of the casket 12. Pivotally secured to each of the rails 54 adjacent one end thereof is a pivotally mounted support arm 58 which normally extends upwardly from the rails 54 and is pivotally secured thereto by pivot pins 60 which are disposed adjacent the inturned or hooked ends 62 of the rails 54 which overlie the upper edge of the casket top 14. A pair of articulated brace members 64 and 66 are connected to the arms 58 and the rails 54 respectively by pivot pins 68 and the brace members 64 and 66 converge inwardly and are pivotally secured by pivot pins 70 to a central sleeve member 72 which is internally threaded for receiving a threaded portion 74 of an elongated actuating rod 76 which is provided with an actuating knob 78 on the inner end and is journaled in and pivotal with a sleeve 80 mounted on a rod 82 which interconnects the longitudinal rails 54 which are also interconnected by rails 84 and 86 thereby forming a rigid unit and permitting rotation of the actuating rod 76. Since the actuating rod 76 is precluded against longitudinal movement, rotation thereof will cause bodily movement of the sleeve 72 thereby varying the angular relation between the articulated brace members 64 and 66 and between the brace members 64 and 66 and the arms 58 and rails 54, respectively, thereby adjusting the angular position of the arms 58 thereby adjusting the angle of inclination of the flower sprays 26 supported on the framework formed by the longitudinal members 16 and the transverse members 18. As will be seen, the pairs of brace members 64, 66 form side-by-side pairs of toggle links.

In operation, the framework may be supported on the casket top 14, as illustrated in Figure 4, or on the casket top 14 when in its open position, as illustrated in Figure 2. By rotating the knob 78, the angular position of the flower sprays 26 may be adjusted and by merely grasping the framework and lifting upwardly, the entire framework and all of the sprays may be removed therefrom. This will permit easy assembly and disassembly of the framework in relation to the supporting rails and provide a flower rack which is easily adaptable for various purposes and which may be quickly and easily assembled. The device may be constructed of any suitable material, and provides a secure attachment for flower sprays, thereby preventing accidental dislodgement of the same.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A flower rack comprising a pair of laterally spaced rails having an intermediate interconnecting rod and means thereon for attaching the same to a casket, a pair of arms extending upwardly from said rails and pivoted thereto for angular adjustment thereon, pairs of side-by-side toggle links for adjusting said arms operatively pivoted to said arms and to said rails, a screw feed sleeve intermediate said pairs of links pivoted thereto for operating the links, a rotatable threaded rod operatively connected to said intermediate rod and sleeve, respectively, for feeding the sleeve, and an open flower supporting frame on said arms angularly adjustable thereby laterally.

2. The combination of claim 1 and fixed and pivoted hook members, respectively, on said frame coacting for holding flowers on the frame.

References Cited in the file of this patent

UNITED STATES PATENTS

| | | |
|---|---|---|
| 1,007,345 | Farris | Oct. 31, 1911 |
| 1,666,568 | Jackson | Apr. 17, 1928 |
| 1,701,419 | Peden | Feb. 5, 1929 |
| 1,890,577 | Flake | Dec. 13, 1932 |
| 2,050,171 | Gilmore | Aug. 4, 1936 |
| 2,225,681 | Braun | Dec. 24, 1940 |
| 2,501,019 | Attick | Mar. 21, 1950 |
| 2,516,379 | Gano | July 25, 1950 |
| 2,700,520 | Skubic | Jan. 25, 1955 |